United States Patent
Rouhani

[11] Patent Number: 5,981,100
[45] Date of Patent: Nov. 9, 1999

[54] STATE OF CHARGE INDICATORS FOR A BATTERY

[75] Inventor: S. Zia Rouhani, Idaho Falls, Id.

[73] Assignee: Lockheed Martin Idaho Technologies Company, Idaho Falls, Id.

[21] Appl. No.: 09/034,535

[22] Filed: Mar. 3, 1998

[51] Int. Cl.⁶ .................................................. H01M 10/48
[52] U.S. Cl. ............................ 429/90; 429/91; 429/225
[58] Field of Search ................................ 429/67, 90, 91, 429/225

[56] References Cited

U.S. PATENT DOCUMENTS

| | | | |
|---|---|---|---|
| 4,129,824 | 12/1978 | Howes | 324/29.5 |
| 5,244,754 | 9/1993 | Bohmer et al. | 429/91 |
| 5,348,813 | 9/1994 | Bohmer et al. | 429/91 |
| 5,438,249 | 8/1995 | Chang et al. | 320/15 |
| 5,567,541 | 10/1996 | Rouhani | 429/93 |
| 5,580,675 | 12/1996 | Rouhani | 429/90 |

*Primary Examiner*—Maria Nuzzolillo
*Assistant Examiner*—Monique M. Wills
*Attorney, Agent, or Firm*—Wells St John Roberts Gregory & Matkin

[57] ABSTRACT

The present invention relates to state of charge indicators for a battery. One aspect of the present invention utilizes expansion and contraction displacements of an electrode plate of a battery to gauge the state of charge in the battery. One embodiment of a battery of the present invention includes an anodic plate; a cathodic plate; an electrolyte in contact with the anodic and cathodic plates; plural terminals individually coupled with one of the anodic and cathodic plates; a separator intermediate the anodic and cathodic plates; an indicator configured to indicate an energy level of the battery responsive to movement of the separator; and a casing configured to house the anodic and cathodic plates, electrolyte, and separator.

57 Claims, 9 Drawing Sheets

STATE OF CHARGE INDICATORS FOR A BATTERY

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

TECHNICAL FIELD

The present invention relates to state of charge indicators for a battery.

BACKGROUND OF THE INVENTION

Batteries of various configurations are used to generate electric current at a certain voltage through conversion of chemical energy into electrical energy. Such batteries typically include plural electrodes and an electrolyte individually having respective reactive masses. The chemical energy is converted into electric energy through a reaction of the reactive masses of the electrodes and/or the electrolyte.

More specifically, batteries typically produce electrical energy through a chemical reaction between the electrolyte solution and at least one electrode in contact with the electrolyte solution, or through a chemical reaction between two electrodes through the electrolyte solution. As the chemical reaction takes place, mass is transferred or exchanged between an electrode and the electrolyte, or between electrodes through the electrolyte. The chemical reaction takes place during the discharge of the battery to create the current that is supplied to a load during battery discharge. Reversed chemical reactions take place during a recharging process.

The weight, density and volume of the reacting electrode or electrodes and/or electrolyte changes during the chemical reactions. The respective volumes of the electrodes and electrolyte can gradually change from first extreme values corresponding to volumes with the battery in a fully charged condition to second extreme values corresponding to volumes with the battery in a functionally discharged condition. The battery is depleted or discharged when the reactive mass of an electrode or the electrolyte is depleted.

Volumetric changes of one or both electrodes and/or the electrolyte of a battery usually occur in a substantially linear fashion as the battery discharges from its substantially fully charged condition to its functionally discharged condition, or vice-versa. If the battery is a rechargeable battery (i.e., secondary battery), the chemical reaction is reversed during recharging. During recharging, volumetric changes are reversed and the respective volumes of the battery components substantially return to the initial respective values corresponding to the battery being fully charged.

More specifically, the chemical reaction producing electricity typically changes the chemical composition of one or more of the internal components of the battery. New chemicals are usually produced as a result of the reaction and the new chemicals typically have different specific volumes. Accordingly, the total volume of internal battery components (i.e., electrodes, electrolyte) changes with every discharging or recharging increment of the battery.

In a discharged condition, a battery is no longer able to supply adequate voltage and current. Primary batteries are typically not rechargeable and are discarded. Secondary batteries are rechargeable by application of an electrical current to the terminals of the battery. In particular, the chemical energy from the reactions between the electrodes and the electrolyte that is spent producing electricity can be replenished by reversing the chemical reactions on the electrodes during a recharging process. The recharging process involves passing an electric current from another source through the battery in the reverse direction.

Primary batteries are usually manufactured for supplying limited amounts of electricity and are used in a wide range of equipment. Secondary batteries are capable of delivering considerable amounts of electricity with high currents and are also used in a wide variety of applications (e.g., backup power supplies, main power source in some electric vehicles).

The amount of electric energy that can be extracted from a battery depends on its electric potential, expressed in Volts, and the number of Coulombs (electric current intensity times its duration expressed in Ampere-hours) that the battery can sustain.

One battery configuration includes lead-acid batteries. These batteries are typically utilized in strong current applications, such as automotive applications. Lead-acid batteries usually include a plurality of cells which are linked with one another. Such batteries are rechargeable by providing a recharging current into the batteries.

Prior art devices have been developed to measure and/or display the amount of remaining electric energy, or a fraction or percentage of the initial total electric energy, known as state of charge, of an electric battery at various stages of the useful life of the battery. For example, U.S. Pat. Nos. 5,567,541 and 5,580,675, both incorporated herein by reference, provide a history of many developments in this field. However, there remains a need to provide a state of charge indicator for batteries having improved features over the existing prior art devices.

BRIEF DESCRIPTION OF THE DRAWINGS

Preferred embodiments of the invention are described below with reference to the following accompanying drawings.

FIG. 5a is a cross-sectional view similar to FIG. 5 of a kit embodiment.

DETAILED DESCRIPTION OF THE PREFERRED EMBODIMENTS

Figure 1:
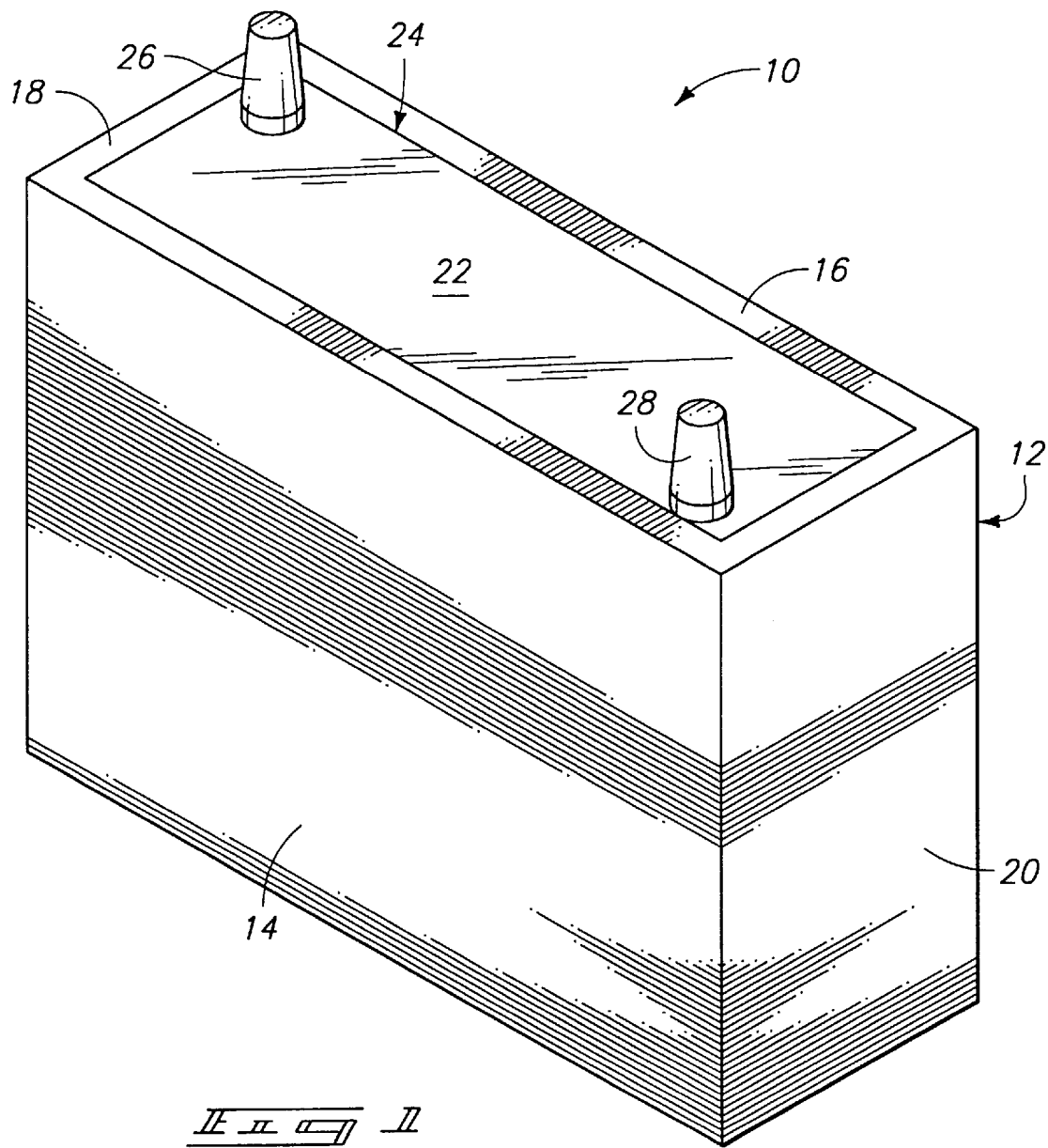
FIG. 1 is an isometric view of a battery.

This disclosure of the invention is submitted in furtherance of the constitutional purposes of the U.S. Patent Laws "to promote the progress of science and useful arts" (Article 1, Section 8).

The present invention is described with reference to lead-acid batteries. The present invention can be utilized with other battery configurations. One aspect of the invention utilizes slight displacements of at least one separator plate of a battery to indicate the instantaneous state of charge of the battery.

In general, measurable expansion and contraction displacements of electrode plates of a battery occur during discharging and recharging of the battery. These expansions and contractions generate some slight lateral movements of separator plates individually positioned between the electrode plates. The lateral movements can be utilized to actuate mechanical and/or electrical movement indicators to display the state of charge of the battery.

In addition, the lateral movements can be utilized to control an electric circuit for providing accurately timed recharging of secondary batteries. Measured movements can be transmitted to proper indicator instruments located on or within battery, or to other indicator instruments remotely located from the battery. In some embodiments, the present invention is implemented as a kit for use in existing battery configurations.

According to one aspect of the present invention, a battery comprises: an anodic plate; a cathodic plate; an electrolyte in contact with the anodic plate and cathodic plate; plural terminals individually coupled with one of the anodic plate and the cathodic plate; a separator intermediate the anodic plate and the cathodic plate; an indicator configured to indicate an energy level of the battery responsive to movement of the separator; and a casing configured to house the anode, cathode, electrolyte, and separator.

According to a second aspect of the present invention, a battery comprises: an electrolyte; a plurality of first electrode plates in contact with the electrolyte, the first electrode plates having a first electrical polarity; a plurality of second electrode plates in contact with the electrolyte, the second electrode plates having a second electrical polarity opposite the first electrical polarity, individual ones of the second electrode plates being positioned intermediate immediately adjacent a separator next to the first electrode plates; a plurality of separators, individual separators being provided intermediate immediately adjacent first and second electrode plates; a first conductor configured to couple the first electrode plates; a second conductor configured to couple the second electrode plates; an indicator configured to indicate an energy level of the battery responsive to movement of the separator; and a casing configured to house the electrolyte, electrode plates, separators and conductors.

Another aspect of the present invention provides an indicator configured to indicate an energy level of a battery including an anodic plate, a cathodic plate, a separator plate intermediate the anodic plate and cathodic plate, and an electrolyte in contact with the anodic plate and cathodic plate, the indicator being configured to couple with the separator plate of the battery, the indicator being operable to indicate the energy level of the battery responsive to movement of the separator plate.

In another aspect of the present invention, a battery comprises: an electrolyte; an anode comprising: a plurality of anodic electrode plates in contact with the electrolyte, the anodic electrode plates having a first electrical polarity; and a conductor configured to couple the anodic electrode plates; a cathode comprising: a plurality of cathodic electrode plates in contact with the electrolyte, the cathodic electrode plates having a second electrical polarity opposite the first electrical polarity, individual ones of the cathodic electrode plates being positioned intermediate immediately adjacent separator plates next to the anodic electrode plates; and a conductor configured to couple the cathodic electrode plates; a plurality of separators, individual separators being provided intermediate immediately adjacent anodic and cathodic electrode plates; an indicator configured to provide an indication of the energy level of the battery responsive to movement of at least one separator, the indicator comprises: a first arm comprising a pointing needle coupled with one separator; a second arm coupled with another separator immediately adjacent the one separator; and a scale coupled with the second arm, both arms being free to rotate around a common axis affixed to one of the conductors, the scale being positioned relative to the pointing needle; and a casing configured to house the electrolyte, anode, cathode, separators, and indicator, the casing including a transparent window configured to permit visual observation of the pointing needle and scale from the exterior of the casing.

Yet another aspect of the present invention provides a battery energy level measuring method comprising: providing a battery including a plurality of electrode plates; spacing adjacent electrode plates using a plurality of separators, the spacing including positioning an individual separator intermediate immediately adjacent electrode plates; sensing movement of one of the separators; and indicating the state of charge of the battery responsive to the sensing.

Referring to FIG. 1, a battery 10 according to the present invention is shown. The illustrated battery 10 comprises a lead-acid battery, but the present invention applies equally to other battery types, such as nickel-cadmium, etc. Battery 10 includes a casing 12. Casing 12 is configured to house internal components including reactive masses and an electrolyte (not shown in FIG. 1) of battery 10.

The depicted casing 12 comprises a front wall 14, rear wall 16, and opposing left and right side walls 18, 20. Casing 12 additionally includes a top wall 22 and a bottom wall (not shown in FIG. 1). The illustrated top wall 22 comprises a transparent window 24 in the disclosed embodiment. Plural conductive terminals 26, 28 are borne by top wall 22 as shown. Terminal 26 comprises one polarity terminal and terminal 28 comprises the opposite polarity terminal in the described embodiment.

Figure 2:
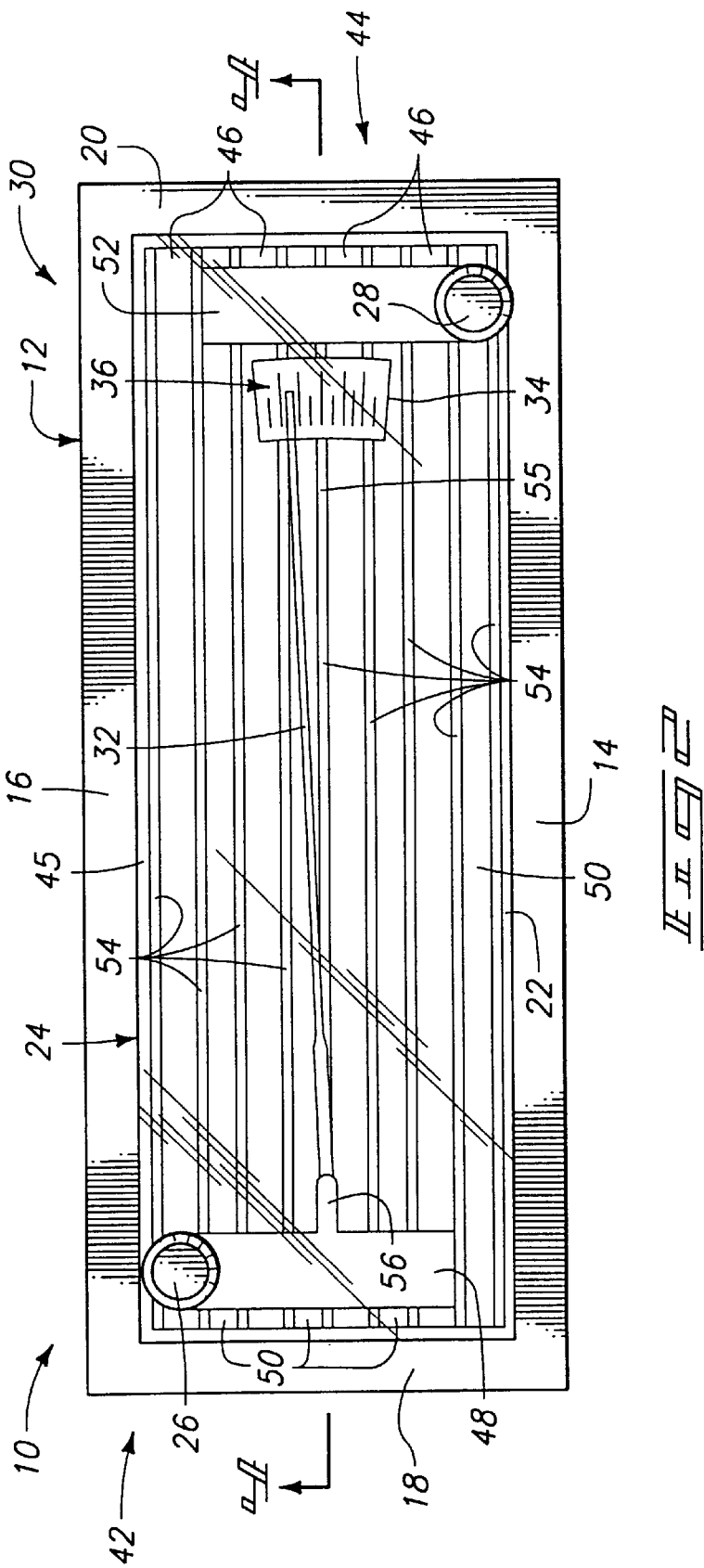
FIG. 2 is a top view of the battery shown in FIG. 1.

Referring to FIG. 2, battery 10 comprises plural electrodes, including an anode 42 and cathode 44, and an electrolyte 45. Anode 42 comprises a plurality of flat electrode plates 46. Anodic plates 46 individually comprise active lead metal in the described embodiment. A conductor 48 electrically couples anodic plates 46 with one another and anodic terminal 26. The illustrated conductor 48 comprises a conductive metallic bar.

Cathode 44 comprises a plurality of cathodic plates 50 and a cathode conductor 52. Cathodic plates 50 individually comprise flat electrode plates of lead-oxide in the described embodiment. Cathode conductor 52 also comprises a metallic conductive bar. Cathode conductor 52 is configured to electrically couple cathodic plates 50 with one another and cathodic terminal 28. Anodic and cathodic plates 46, 50 are rigid in one embodiment.

Casing 12 includes electrolyte 45. Anodic and cathodic plates 46, 50 are preferably immersed into the electrolyte 45. In one embodiment, electrolyte 45 comprises sulfuric acid.

Battery 10 includes a plurality of separators 54. Separators 54 comprise flexible plates in the illustrated embodiment. Separator plates 54 are provided adjacent opposite sides of individual ones of electrode plates 46, 50 as shown in FIG. 2.

Individual conductors 48, 52 are coupled with an upper edge of respective electrode plates 46, 50. Conductive bars 48, 52 are configured to rigidly attach respective electrode plates 46, 50 to one another in the described embodiment. In particular, the alternating electrode plates 46, 50 and separator plates 54 are tied together in a preferred embodiment to provide mechanical stability within battery 10.

Such rigid attachment of electrode plates 46, 50 and separators 54 fixes the respective center-to-center distances of electrode plates 46, 50. Despite the fact that electrode plates 46, 50 are fixed in position with respect to one another, slight lateral movements of individual separator plates 54 occur during discharging and recharging cycles of battery 10.

The lateral movements of individual separator plates 54 are a result of changes in the specific volume of the active materials of the respective electrode plates 46, 50. The changes in specific volume are due to the occurrence of chemical reactions during discharging and recharging of battery 10.

In accordance with the present invention, the lateral movements of at least one separator plate 54 are utilized to provide state of charge information of battery 10. In particular, small lateral displacements of at least one separator plate 54 are utilized to gauge the energy level or state of charge of battery 10.

Lateral movements of an individual separator plate 54 can be sensed by a variety of electronic, electromagnetic, optical or mechanical apparatuses and methods. Lateral movements of the separator plates 54 are preferably thereafter correlated into energy level information of battery 10.

Battery 10 includes an indicator 30 to provide such correlation in the described embodiment of the invention. The disclosed indicator 30 is configured to sense movement of at least one separator plate 54 and display state of charge information responsive to the movement. Indicator 30 indicates the energy level of the battery corresponding to a position of the separator plate 54.

Indicator 30 is configured to continuously display the state of charge in one embodiment. In the preferred embodiment of the invention, indicator 30 is configured to display energy level information regarding battery 10 regardless of battery 10 being idle, or operating in a discharging cycle or a recharging cycle. Further, displaying energy level information of battery 10 via indicator 30 does not utilize any internal electrical energy of battery 10.

One embodiment of indicator 30 configured to sense lateral displacements of an individual separator plate 54 is illustrated in FIGS. 2–5. The separator plate 54 being monitored is identified with reference number 55 in the presently described embodiment of indicator 30.

Figure 4:
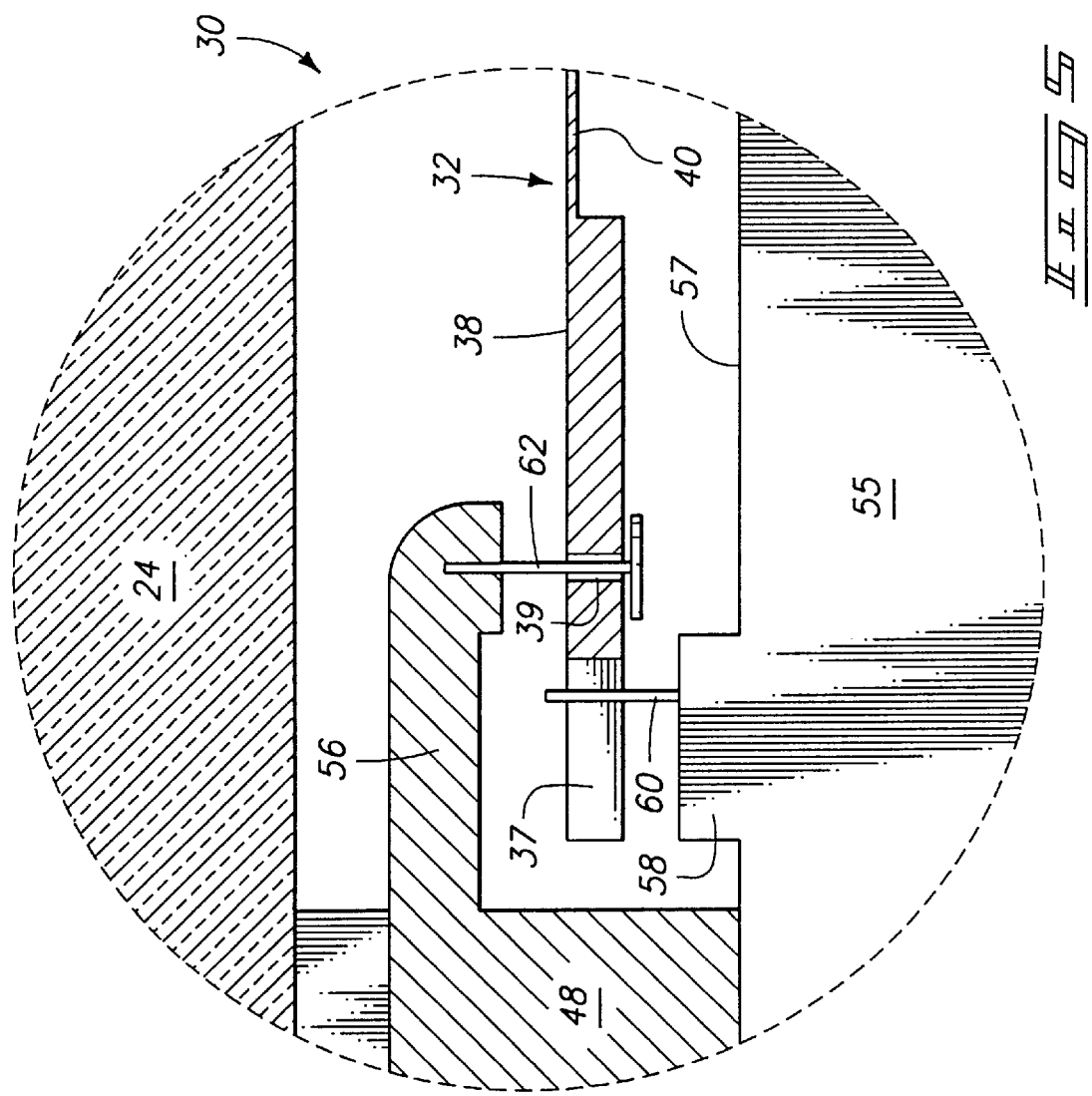
FIG. 4 is a cross-sectional view taken along line 4—4 of FIG. 2.

Referring again to FIG. 2, indicator 30 comprises a sensor needle 32, scale 34 and indicia 36 in the described embodiment. Other configurations are possible. The depicted sensor 32 comprises a pointing needle. The scale 34 includes indicia 36 upon an upper surface thereof. The illustrated indicia 36 comprises a plurality of marks. Indicia 36 comprises numbers (e.g., values) or colors, or both, to convey energy level information of the current state of battery 10 in other embodiments. Scale 34 is attached to a lower surface of transparent window 24 as shown in FIG. 4. Such positioning facilitates external observation of sensor 32 and scale 34 which indicate the state of charge of battery 10. Sensor 32 is configured to point a value of indicia 36 to indicate the energy level of battery 10 in one embodiment. Scale 34 is preferably at least semi-transparent in the described embodiment.

Figure 3:
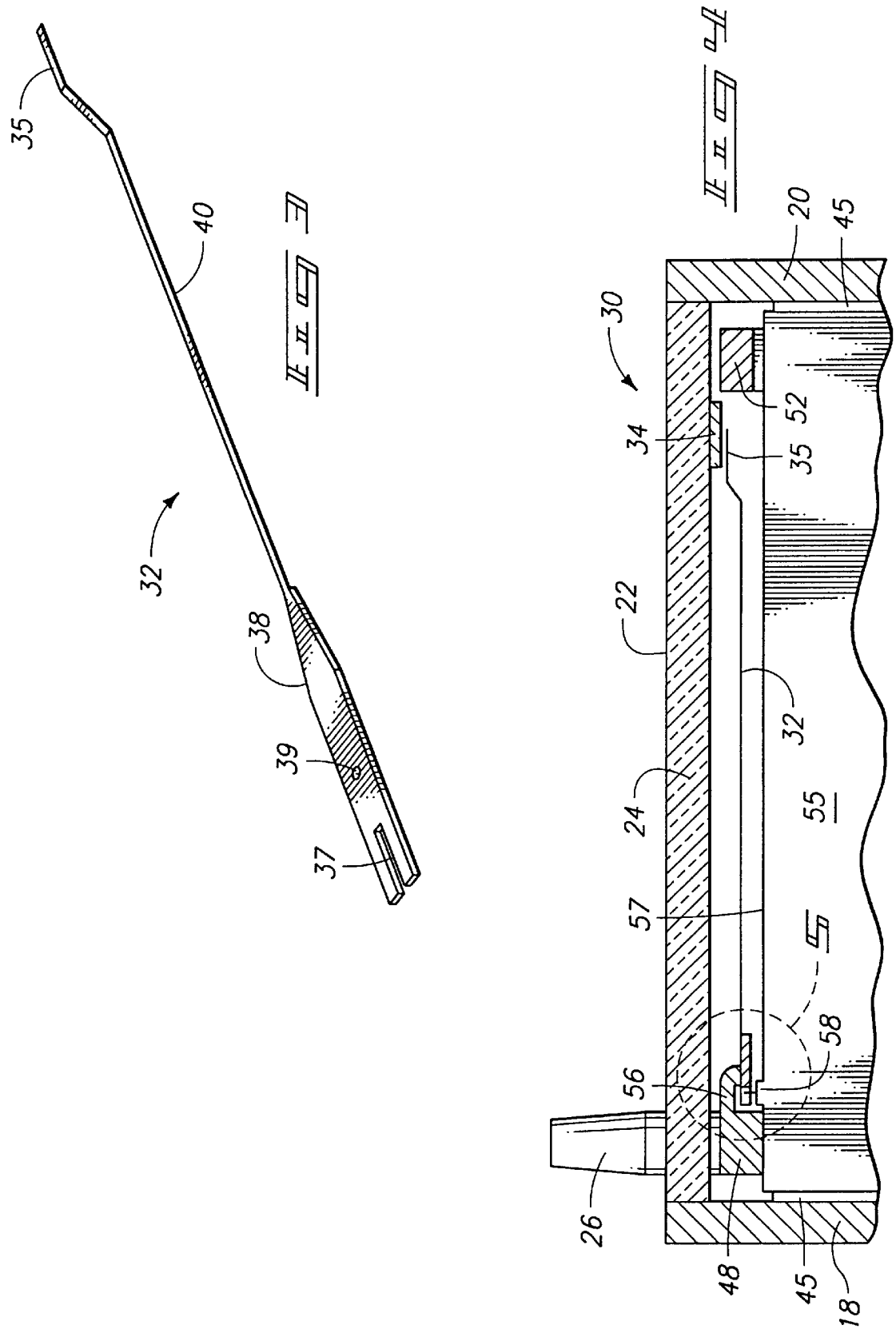
FIG. 3 is an isometric view of a pointing needle according to one embodiment of an indicator of the battery.

Referring to FIG. 3, pointing needle 32 of indicator 30 comprises an elongated plastic material in the described embodiment. Pointing needle 32 comprises a base 38, elongated arm 40 and tip 35. Pointing needle 32 is configured to pivot responsive to lateral displacements of individual separator plate 55. Needle base 38 includes a slot 37 and an aperture 39.

Referring again to FIG. 2, pointing needle 32 is operable to progress across indicia 36 of scale 34 responsive to battery 10 being discharged or recharged. In particular, pointing needle 32 is configured to move relative to scale 34 to indicate the energy level of battery 10. A particular value or marking identified by pointing needle 32 represents the instantaneous state of charge of battery 10.

Transparent window 24 comprises a portion of casing 12 adjacent indicator 30. State of charge information displayed by indicator 30 is visible from the exterior of battery 10 through transparent window 24.

Figure 5:
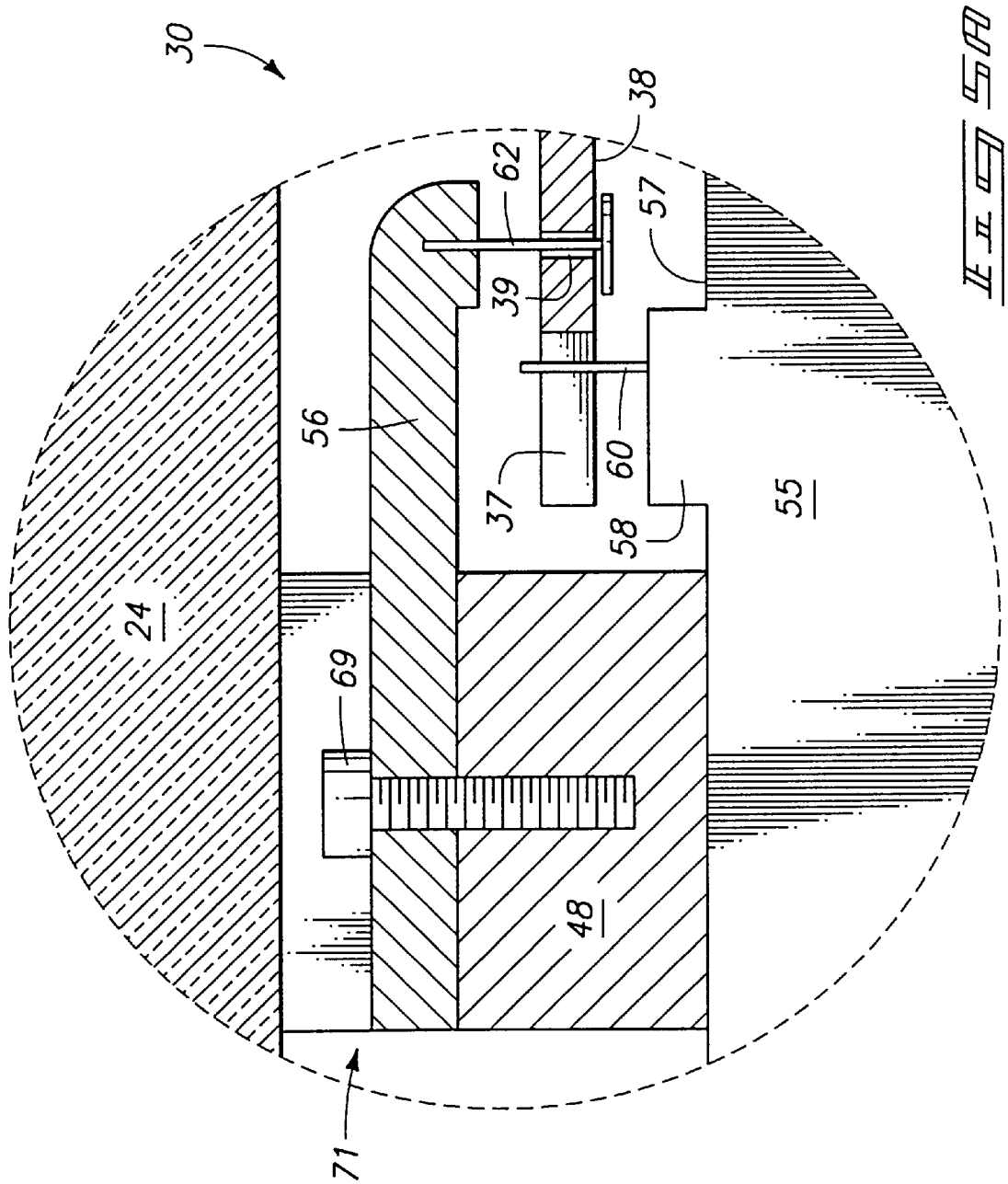
FIG. 5 is a cross-sectional view of features of the indicator shown in FIG. 4.

Referring to FIGS. 4, 5, interaction of pointing needle 32 with individual separator plate 55 is described. The illustrated anodic conductor 48 includes a short arm 56 as shown in FIG. 4. Arm 56 defines the pivoting axis for pointing needle 32.

Referring to FIG. 5, arm 56 is configured to receive a pin 62. Pin 62 establishes the axis of rotation of pointing needle 32. Aperture 39 of pointing needle 32 is configured to receive pin 62. In particular, pointing needle 32 is configured to rotate about pin 62 responsive to lateral movements of separator plate 55 in the described embodiment. Indicator 30 is configured to magnify or amplify movements of separator plate 55 providing an amplified indication of the energy level of battery 10. Due to the positioning of needle 32 about pin 62, a movement of pin 60 results in amplified movement of tip 35. More specifically, tip 35 is spaced from pin 62 a distance greater than the distance intermediate pin 60 and pin 62.

In the described embodiment, separator plates 54 individually include an upper edge and an extension. Separator plate 55 includes upper edge 57 as shown in FIG. 5. Separator plate 55 includes an extension 58 configured to rise slightly above respective upper edges of electrode plates 46, 50 and upper edge 57 of separator plate 55. Extension 58 of separator plate 55 is configured to support a vertical pin 60 which extends from an upper surface of extension 58. Slot 37 of pointing needle 32 is configured to receive pin 60 attached to extension 58. Slight incremental movements of separator plate 55, extension 58 and pin 60 cause a pivoting motion of pointing needle 32 about pin 62. In a particular embodiment, needle 32 is made of a material (e.g., plastic) having a specific gravity substantially equal to an average specific gravity of the electrolyte solution 45. Such provides a substantially weightless needle 32 when the needle is immersed in electrolyte 45.

Individual extensions can be attached to respective top edges of other separator plates 54 to be monitored in another embodiment.

Referring again to FIG. 2, tip 35 of pointing needle 32 moves responsive to lateral movements of separator plate 55. Tip 35 of needle 32 is provided adjacent scale 34. Movement of tip 35 of needle 32 with respect to indicia 36 of scale 34 provides state of charge information of battery 10. In particular, the position of tip 35 against the graded scale of indicia 36 identifies a marking or value of the indicia. The identification corresponds to the state of charge of battery 10.

Referring to FIG. 5*a*, another embodiment is described. In this embodiment, a complete state of charge indicator system 30 according to FIGS. 2–5 comprising transparent window 24, pointing needle 32, scale 34 with indicia 36, separator extension 58 with vertical pin 60, supporting arm 56, and pivoting pin 62 are made as an accessory or improvement kit 71 for existing battery cells. The supporting arm 56 in one embodiment of kit 71 is equipped with a saddling attachment or screw 69 for fixing arm 56 to the conductor bar 48 as shown in FIG. 5a. Kit 71 can be utilized with existing batteries.

Referring to FIGS. 6–9, an alternative embodiment of indicator 30a is described. Indicator 30a provides increased sensitivity to lateral movements of selected separator plates 54. Like numerals represent like components in the following described embodiment with any significant differences being represented by the alphabetical suffix "a".

Figure 6:
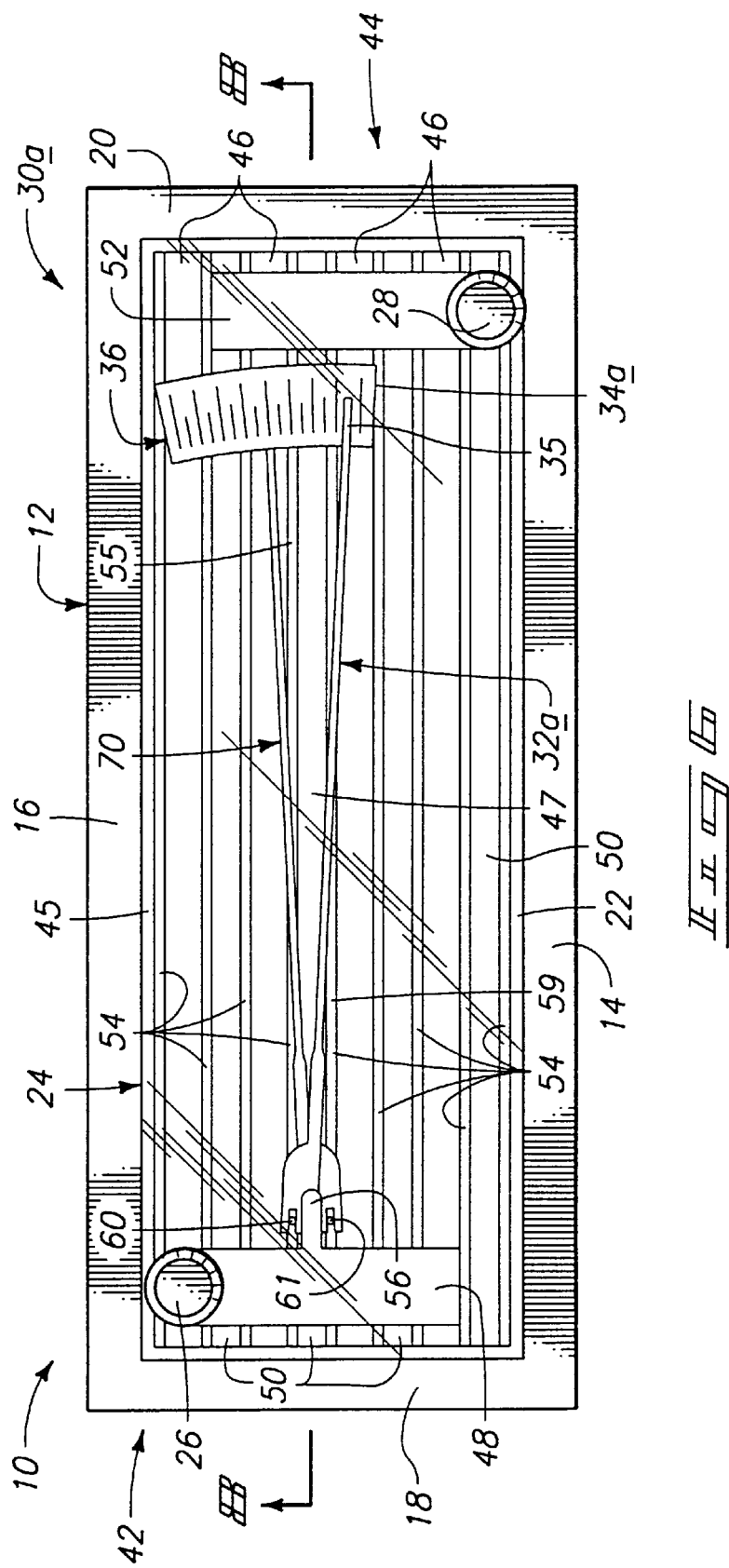
FIG. 6 is a top view of a battery.

Referring to FIG. 6, indicator 30a includes a first sensor 32a and a second sensor 70. First sensor 32a is configured to indicate movement of separator plate 55 and second sensor 70 is configured to indicate movement of another separator plate 59. Separator plate 59 is immediately adjacent to separator plate 55 being sensed by first sensor 32a. Separator plates 55, 59 are adjacent opposite sides of cathodic plate 47. Sensing movements of plural separator plates 55, 59, as illustrated in FIG. 6, provides increased sensitivity to changes in specific volume occurring during discharging and recharging of battery 10.

Figure 7:
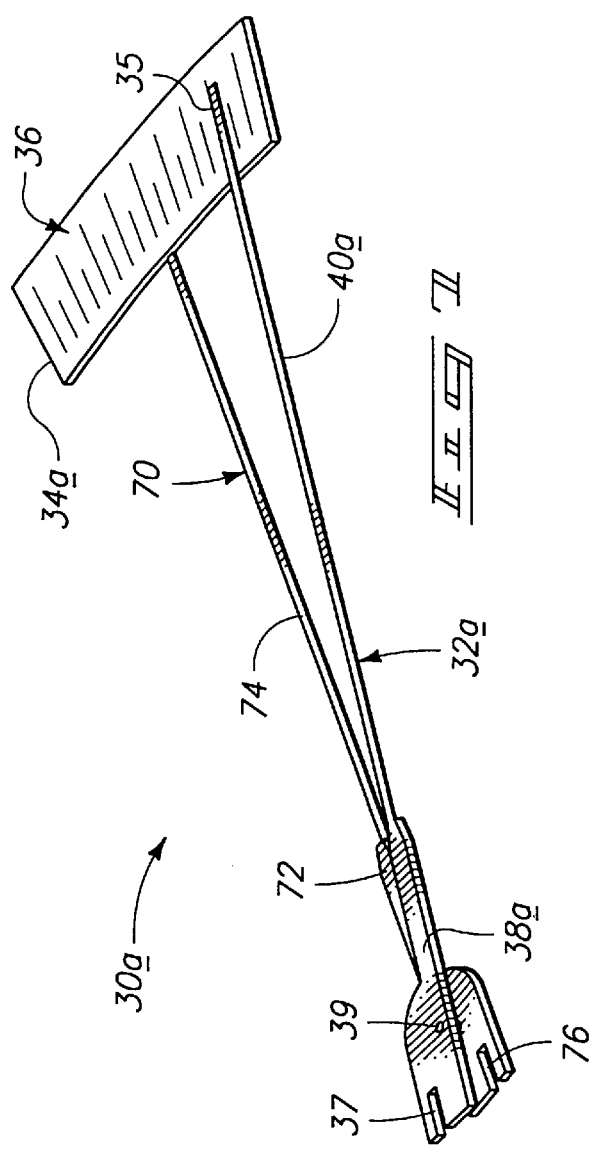
FIG. 7 is an isometric view of a pointing needle and a scale of an indicator of the battery shown in FIG. 6.

Referring to FIG. 7, first sensor 32a and second sensor 70 of indicator 30a are shown in detail. In particular, second sensor 70 comprises a base 72, elongated arm 74 and graded scale 34a. Elongated arm 74 couples base 72 with scale 34a. An upper surface of scale 34a includes indicia 36. In a preferred embodiment of this invention, the first sensor 32a and second sensor 70 are made of a material such as plastic having a specific gravity substantially equal to the average specific gravity of the electrolyte solution. This makes sensors 34a, 70 substantially weightless when submerged in electrolyte 45.

Base 72 of second sensor 70 includes a slot 76 and an aperture 78 which corresponds to aperture 39 of sensor 32a (aperture 78 is not shown in FIG. 7). Aperture 78 is configured to receive pin 62 as shown in FIG. 9.

Figure 8:
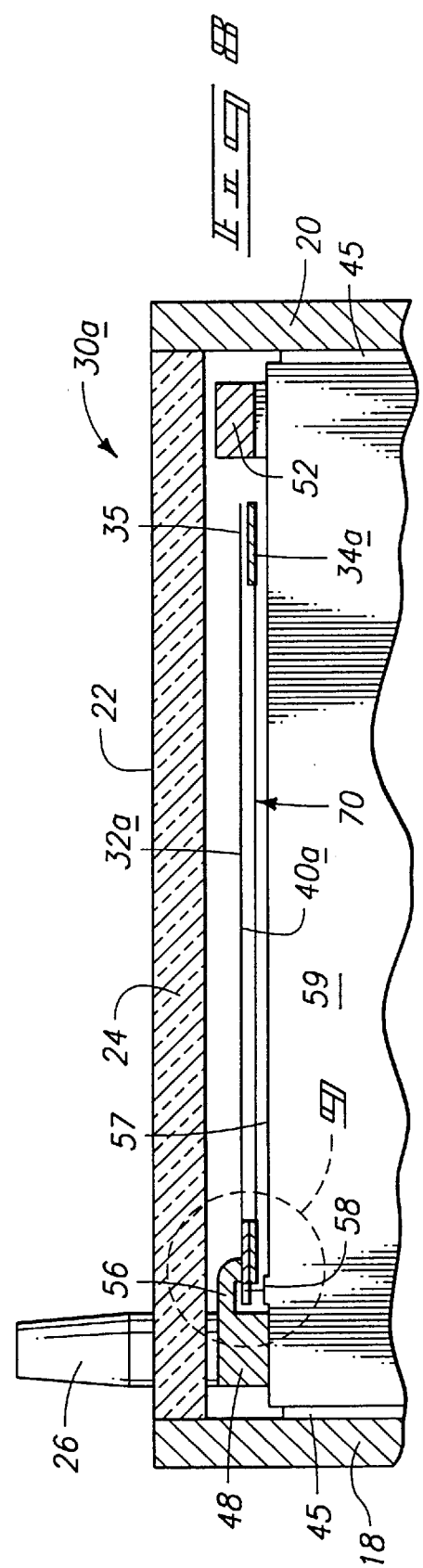
FIG. 8 is a cross-sectional view taken along line 8—8 of FIG. 6.
Figure 9:
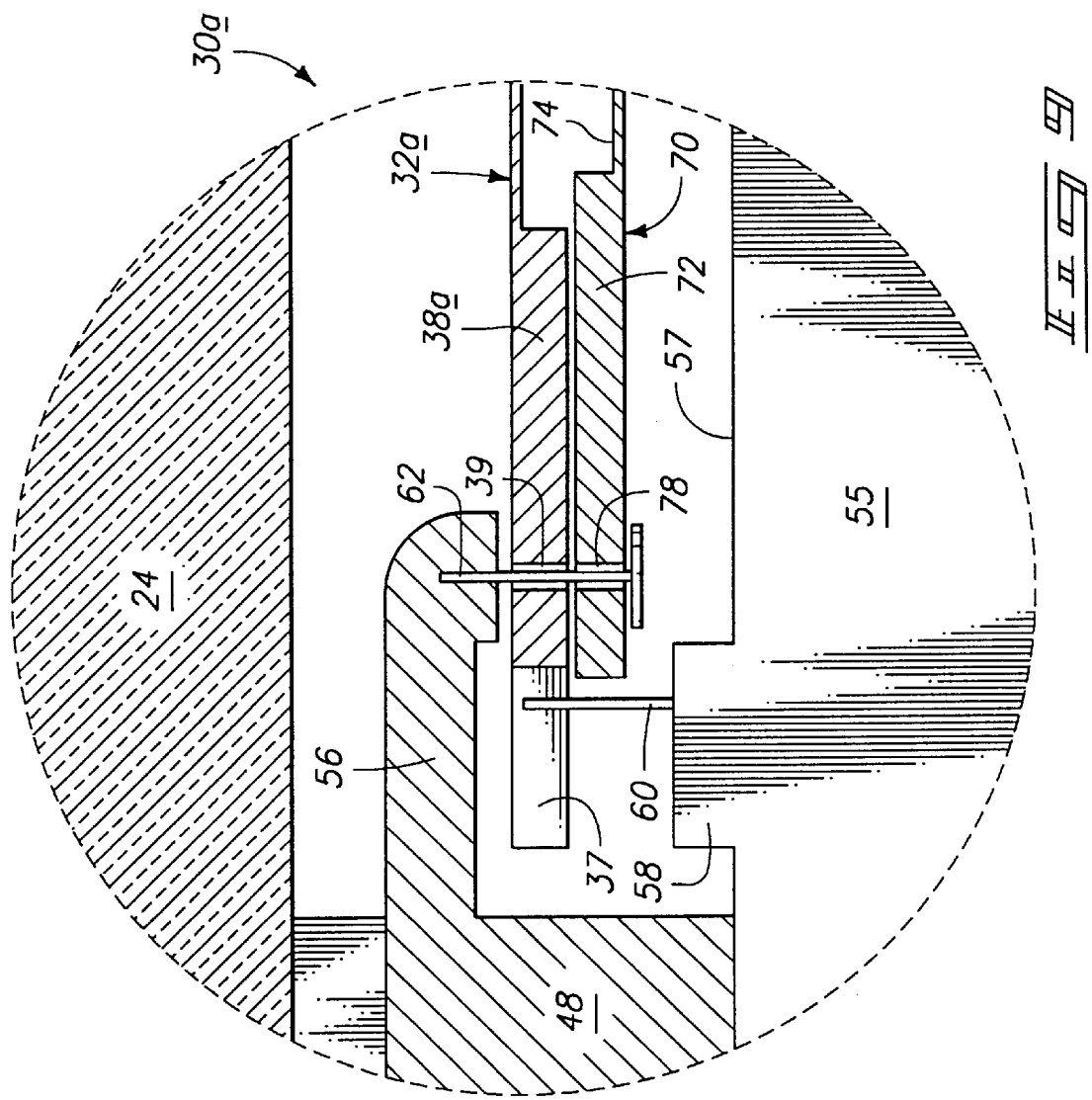
FIG. 9 is a cross-sectional view of features of the indicator shown in FIG. 8.

Referring to FIGS. 8, 9, second sensor 70 is configured to rotate about pin 62. First sensor 32a is also configured to rotate about pin 62. More specifically, graded scale 34a is configured to pivot about pin 62 responsive to lateral movement of separator plate 59 (shown in FIG. 6). Separator plate 59 includes an extension and a pin 61 (pin 61 is shown in FIG. 6). Slot 76 of second sensor 70 receives pin 61. Scale 34a of second sensor 70 rotates due to lateral movement of separator plate 59 and pin 61. Pointing needle 32a is configured to rotate responsive to lateral movements of separator plate 55 and pin 60.

Separator plates 55, 59 move in opposite directions with respect to pivoting axis 62 responsive to expansion or contraction of electrode plate 47. Slight movements of both separator plates 55, 59 rotate pointing needle 32a and scale 34a with respect to one another and doubles the movement of indicator 35 with respect to moving scale 34a. Furthermore, the increased ratio of movement of arms 40a, 74 with respect to the short actuator arms (distance intermediate respective pins 60, 61 and axis of rotation defined by pin 62) amplifies the indicated displacements at scale 34a and magnifies the lateral movements of separator plates 55, 59.

Referring again to FIG. 6, the position of pointing needle tip 35 with respect to indicia 36 upon moving scale 34a indicates the state of charge of battery 10. Needle tip 35, indicia 36 and scale 34a are visible from the exterior of battery 10 through transparent window 24. Relative movements of first sensor 32a and second sensor 70 are sensed by electronic, electromagnetic, or electro-optical devices in other embodiments and the sensed signals are transmitted to electronic or optical readers located outside the battery or at a remote location.

In yet another implementation of this invention, a complete state of charge indicator system 30a, according to FIGS. 6–9, comprising transparent window 24, first sensor 32a, second sensor 70 with its details, graded scale 34a and indicia 36, separator extensions 58 with pins 60, 61, the supporting arm 56 and pivoting pin 62 are made as an improvement kit for existing battery cells. The supporting arm 56 in this kit is equipped with an additional fixture for attachment to an existing conductor bar 48. Indicator 30a can be implemented similar to the configuration of kit 71 shown in FIG. 5a in one embodiment.

Figure 10:
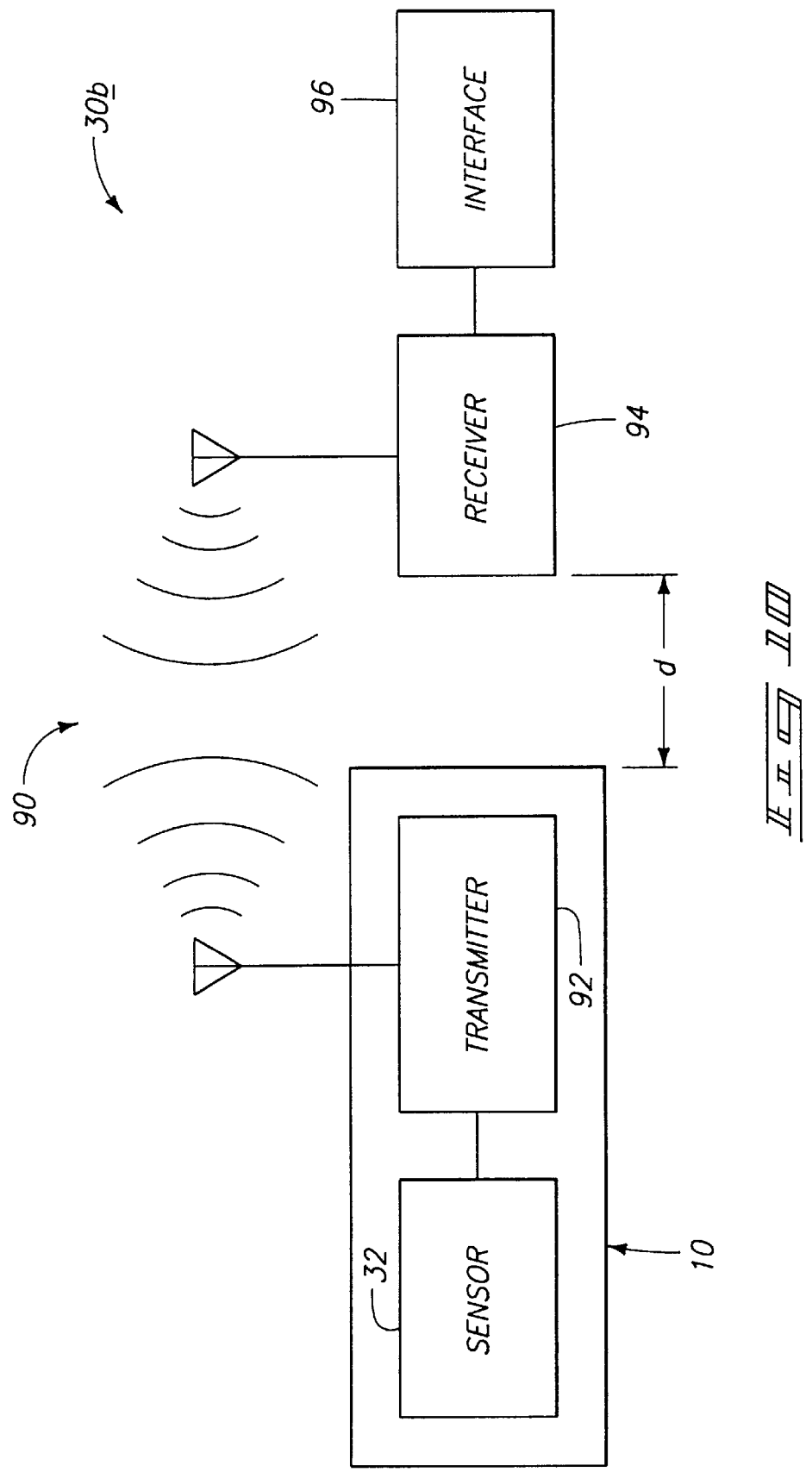
FIG. 10 is a functional block diagram of an indicator configured to provide energy level information of a battery at a remote location.

Referring to FIG. 10, the illustrated indicator 30b is configured to provide energy level information of battery 10 at a position or location spaced a distance "d" from battery 10. Battery 10 includes sensor 32 configured to monitor or sense movements of a separator plate within battery 10. Signals corresponding to movements of the separator plate are applied to a communication system 90.

In the illustrated embodiment, communication system 90 comprises a radio frequency communication system, although other configurations can be utilized. Communication system 90 includes a transmitter 92 and receiver 94. Transmitter 92 is configured to output signals corresponding to the energy level information of battery 10. Receiver 94 is configured to receive the outputted signals from transmitter 92. Receiver 94 is coupled with an interface 96 configured to output or display energy level information corresponding to the sensed signals generated by sensor 32 responsive to movements of a separator plate within battery 10. Interface 96 is provided at a remote location or position spaced from battery 10 in one embodiment. Interface 96 may also be provided attached to battery 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A battery comprising:
   an anodic plate;
   a cathodic plate;
   an electrolyte in contact with the anodic plate and the cathodic plate;
   plural terminals individually coupled with one of the anodic plate and the cathodic plate;
   a separator intermediate the anodic plate and the cathodic plate;
   an indicator configured to indicate an energy level of the battery responsive to movement of the separator; and
   a casing configured to house the anodic plate, cathodic plate, electrolyte and separator.

2. The battery according to claim 1 wherein the indicated energy level is the state of charge.

3. The battery according to claim 1 wherein the separator is flexible and the anodic and cathodic plates are rigid.

4. The battery according to claim 1 wherein the battery comprises a lead-acid battery.

5. The battery according to claim 1 wherein a portion of the casing adjacent the indicator is transparent.

6. The battery according to claim 1 wherein the indicator includes a needle connected with the separator, the needle being movable responsive to the movement of the separator.

7. The battery according to claim 6 wherein the needle comprises a material having a specific gravity substantially equal to an average specific gravity of the electrolyte.

8. The battery according to claim 6 wherein the indicator further includes a scale adapted to provide the energy level of the battery with the needle.

9. The battery according to claim 1 further comprising a plurality of anodic plates and cathodic plates.

10. The battery according to claim 9 wherein the anodic plates are electrically coupled with one another and the cathodic plates are electrically coupled with one another.

11. The battery according to claim 9 further comprising a plurality of separators individually positioned intermediate immediately adjacent anodic and cathodic plates.

12. The battery according to claim 11 wherein the indicator includes:
  a first sensor configured to move responsive to movement of one of the separators; and
  a second sensor configured to move responsive to movement of another separator immediately adjacent the one separator.

13. The battery according to claim 12 wherein the first sensor comprises a pointing needle and the second sensor comprises a scale.

14. The battery according to claim 13 wherein the pointing needle and scale individually comprise a material having a specific gravity substantially equal to an average specific gravity of the electrolyte.

15. The battery according to claim 1 wherein the indicator is configured to amplify the movement of the separator.

16. The battery according to claim 1 further comprising an extension coupled with the separator.

17. The battery according to claim 1 wherein the indicator is further configured to indicate the energy level of the battery corresponding to a position resulting from movement of the separator.

18. The battery according to claim 1 wherein the indicator is configured to indicate the energy level of the battery at a location spaced from the battery.

19. The battery according to claim 1 wherein the casing is configured to house the indicator.

20. A battery comprising:
  an electrolyte;
  a plurality of first electrode plates in contact with the electrolyte, the first electrode plates having a first electrical polarity;
  a plurality of second electrode plates in contact with the electrolyte, the second electrode plates having a second electrical polarity opposite the first electrical polarity, individual ones of the second electrode plates being positioned intermediate immediately adjacent first electrode plates;
  a plurality of separators individually provided intermediate immediately adjacent first and second electrode plates;
  a first conductor configured to couple the first electrode plates;
  a second conductor configured to couple the second electrode plates;
  an indicator configured to indicate an energy level of the battery responsive to movement of one of the separators; and
  a casing configured to house the electrolyte, electrode plates, separators and conductors.

21. The battery according to claim 20 wherein the indicated energy level is the state of charge.

22. The battery according to claim 20 wherein the separators are flexible and the electrode plates are rigid.

23. The battery according to claim 20 wherein the battery comprises a lead-acid battery.

24. The battery according to claim 20 wherein a portion of the casing adjacent the indicator is transparent.

25. The battery according to claim 20 wherein the indicator includes a needle connected with the one separator, the needle being movable responsive to the movement of the one separator.

26. The battery according to claim 25 wherein the needle comprises a material having a specific gravity substantially equal to an average specific gravity of the electrolyte.

27. The battery according to claim 25 wherein the indicator further includes a scale adapted to provide the energy level of the battery with the needle.

28. The battery according to claim 27 wherein the pointing needle and scale individually comprise a material having a specific gravity substantially equal to an average specific gravity of the electrolyte.

29. The battery according to claim 20 wherein the indicator includes:
  a first sensor configured to move responsive to movement of the one separator; and
  a second sensor configured to move responsive to movement of another separator immediately adjacent the one separator.

30. The battery according to claim 29 wherein the first sensor comprises a pointing needle and the second sensor comprises a scale.

31. The battery according to claim 20 wherein the indicator is configured to amplify the movement of the separator.

32. The battery according to claim 20 further comprising an extension coupled with the separator.

33. The battery according to claim 20 wherein the indicator is further configured to indicate the energy level of the battery corresponding to a position resulting from movement of the separator.

34. The battery according to claim 20 wherein the indicator is configured to indicate the energy level of the battery at a location spaced from the battery.

35. The battery according to claim 20 wherein the casing is configured to house the indicator.

36. An indicator configured to indicate an energy level of a battery including an anodic plate, a cathodic plate, a separator intermediate the anodic plate and cathodic plate, and an electrolyte in contact with the anodic plate and cathodic plate, the indicator being configured to couple with the separator of the battery, the indicator being operable to indicate the energy level of the battery responsive to movement of the separator.

37. The indicator according to claim 36 wherein the indicator includes a needle connected with the separator.

38. The indicator according to claim 36 wherein the indicator includes an extension coupled with the separator.

39. The indicator according to claim 38 wherein the indicator includes a needle connected with the extension.

40. The indicator according to claim 36 wherein the indicator includes:

a needle configured to move responsive to movement of the separator; and a scale adapted to provide the energy level of the battery with the needle.

41. The indicator according to claim 36 wherein the indicator is configured to amplify movement of the separator.

42. The indicator according to claim 36 wherein the indicator comprises a kit.

43. The indicator according to claim 36 wherein the indicator comprises:

a needle configured to move responsive to movement of the separator; and a scale configured to move responsive to movement of another separator, the scale being adapted to provide the energy level of the battery with the needle.

44. The indicator according to claim 43 wherein the indicator comprises a kit.

45. The indicator according to claim 36 wherein the indicator is further configured to indicate the energy level of the battery corresponding to a position resulting from movement of the separator.

46. A battery comprising:

an electrolyte;

an anode comprising:

a plurality of anodic electrode plates in contact with the electrolyte, the anodic electrode plates having a first electrical polarity; and a conductor configured to couple the anodic electrode plates;

a cathode comprising:

a plurality of cathodic electrode plates in contact with the electrolyte, the cathodic electrode plates having a second electrical polarity opposite the first electrical polarity, individual ones of the cathodic electrode plates being positioned intermediate immediately adjacent anodic electrode plates; and a conductor configured to couple the cathodic electrode plates;

a plurality of separators individually provided intermediate immediately adjacent anodic and cathodic electrode plates;

an indicator configured to provide an indication of the energy level of the battery responsive to movement of plural separators, the indicator comprises:

a first arm comprising a pointing needle coupled with one separator;

a second arm coupled with another separator immediately adjacent the one separator; and a scale coupled with the second arm, the scale being positioned relative to the pointing needle; the first arm, second arm, and scale individually comprising a material having a specific gravity substantially equal to an average specific gravity of the electrolyte; and a casing configured to house the electrolyte, anode, cathode, separators, and indicator, the casing including a transparent window configured to permit visual observation of the pointing needle and scale from the exterior of the casing.

47. A battery energy level measuring method comprising:

providing a battery including a plurality of electrode plates;

spacing the electrode plates using a plurality of separators, the spacing including positioning an individual separator intermediate immediately adjacent electrode plates;

sensing movement of one of the separators; and indicating the energy level of the battery responsive to the sensing.

48. The method according to claim 47 wherein the indicating comprises indicating during charging and discharging of the battery.

49. The method according to claim 47 wherein the providing further comprises forming a lead-acid battery including:

coupling electrode plates of a first electrical polarity forming an anode; and coupling electrode plates of a second electrical polarity forming a cathode.

50. The method according to claim 47 wherein the sensing comprises moving a pointing needle responsive to movement of the one separator.

51. The method according to claim 50 wherein the indicating comprises pointing a value upon a scale using the pointing needle.

52. The method according to claim 47 further comprising sensing movement of another separator immediately adjacent the one separator.

53. The method according to claim 52 wherein the sensing movement of the one separator comprises moving a pointing needle responsive to movement of the one separator, and the sensing movement of the another separator comprises moving a scale responsive to movement of the another separator.

54. The method according to claim 53 wherein the indicating comprises pointing a value upon the scale using the pointing needle.

55. The method according to claim 47 further comprising coupling a kit with the battery, the kit being configured to sense movement of the one separator and indicate the energy level of the battery.

56. The method according to claim 47 wherein the indicating comprises indicating the state of charge of the battery.

57. The method according to claim 47 wherein the indicating comprises remotely indicating the energy level of the battery.

* * * * *